(12) United States Patent
Kim et al.

(10) Patent No.: US 10,641,691 B2
(45) Date of Patent: May 5, 2020

(54) POLYMER TOTAL DISSOLVED SOLIDS VESSEL

(71) Applicants: Edward Jino Kim, Riverdale, GA (US); Joseph Martin Boyd, Mount Pleasant, SC (US); David Alan Smith, Mount Pleasant, SC (US)

(72) Inventors: Edward Jino Kim, Riverdale, GA (US); Joseph Martin Boyd, Mount Pleasant, SC (US); David Alan Smith, Mount Pleasant, SC (US)

(73) Assignee: Environmental Express, Inc., Charleston, SC (US)

( * ) Notice: Subject to any disclaimer, the term of this patent is extended or adjusted under 35 U.S.C. 154(b) by 0 days.

(21) Appl. No.: 16/372,715

(22) Filed: Apr. 2, 2019

(65) Prior Publication Data
US 2019/0226962 A1    Jul. 25, 2019

Related U.S. Application Data

(62) Division of application No. 14/640,552, filed on Mar. 6, 2015, now abandoned.
(Continued)

(51) Int. Cl.
*G01N 5/04* (2006.01)
*B01L 3/00* (2006.01)
*B01L 7/00* (2006.01)

(52) U.S. Cl.
CPC ............. *G01N 5/045* (2013.01); *B01L 3/505* (2013.01); *G01N 5/04* (2013.01); *B01L 7/00* (2013.01);
(Continued)

(58) Field of Classification Search
CPC ................................. B01L 3/508; G01N 5/04
See application file for complete search history.

(56) References Cited

U.S. PATENT DOCUMENTS

| | | | |
|---|---|---|---|
| 5,223,315 A | 6/1993 | Katsura et al. | |
| 5,302,344 A | 4/1994 | Perlman | |
| | (Continued) | | |

FOREIGN PATENT DOCUMENTS

| | | |
|---|---|---|
| WO | 2003033371 | 4/2003 |
| WO | 2008136002 | 11/2008 |
| WO | 2012003042 | 1/2012 |

OTHER PUBLICATIONS (TAPP!) method T211 om-02, Ash in Wood, Pulp, Paper and Paperboard: Combustion At 525°C, Technical Association of the Pulp and Paper Industry. published 2002. Retrieved from the Internet. Retrieved from (http://research.cnr.ncsu.edu/wpsanalytical/documents/T211.PDF>; sections 5.1, 9.2.1, 9.2.2, 9.2.3.

*Primary Examiner* — Lisa M Caputo
*Assistant Examiner* — Alex T Devito
(74) *Attorney, Agent, or Firm* — Dentons Cohen & Grisby P.C.

(57) ABSTRACT

A thin film vessel useable in gravimetric methods for measuring the total dissolved solids or total solids in a liquid sample, or the moisture content of a solid sample. The vessel includes a main body formed of a thin walled polymeric material having a melting temperature greater than 180° C. The main body comprises an open top edge and a sealed bottom edge which define an inner cavity configured to hold a volume of liquid, and indicia applied to a portion of the main body, wherein the indicia include a tare weight of the vessel.

14 Claims, 3 Drawing Sheets

Related U.S. Application Data

(60) Provisional application No. 61/968,618, filed on Mar. 21, 2014.

(52) U.S. Cl.
CPC ... *B01L 2300/028* (2013.01); *B01L 2300/123* (2013.01); *Y10T 29/49776* (2015.01)

(56) References Cited

U.S. PATENT DOCUMENTS

| | | |
|---|---|---|
| 6,443,166 B1 | 9/2002 | Tunney et al. |
| 7,025,936 B1 | 4/2006 | Brits |
| 8,591,109 B2 | 11/2013 | Ackerman et al. |
| 2007/0059219 A1 | 3/2007 | Turner |
| 2011/0192491 A1 | 8/2011 | Luchinger et al. |
| 2013/0264127 A1 | 10/2013 | Kawanishi |

POLYMER TOTAL DISSOLVED SOLIDS VESSEL

CROSS-REFERENCE TO RELATED APPLICATION

This is a divisional application of U.S. application Ser. No. 14/640,552, filed on Mar. 6, 2015, which claims the benefit of priority of U.S. Provision Application Ser. No. 61/968,619, filed on Mar. 21, 2014, the right of priority of which is claimed in the present application and the subject matter of both of which is incorporated herein by reference in its entirety.

BACKGROUND OF THE INVENTION

1. Technical Field of the Invention

This invention pertains generally to a polymeric vessel or bag useable for testing of total dissolved solids and total solids in a sample. More specifically, the invention pertains to a thin film vessel or bag formed of a polymeric material with a melt temperature greater than 180° C. which may be used in gravimetric methods for measuring the total dissolved solids and total solids in a liquid sample, or the percent moisture of a solid sample.

2. Description of the Related Art

The term "total dissolved solids" refers generally to any inorganic materials (minerals, salts, metals, cations, and/or anions) and/or organic materials that are dissolved in a water sample. The term "total suspended solids" refers generally to the small solid particles that remain in suspension in a water sample and which may be collected on a filter having a pore size of two micrometers. Together, the suspended solids and dissolved solids are referred to as the "total solids", and include many of the substances that impair water color, odor, taste, and/or overall water quality. For example, typical stream water contains total dissolved solids which consist mainly of calcium, chlorides, nitrates, phosphorus, iron, sulfur, and other ionic and non-ionic particles that will pass through a filter having pores of around 2 microns (0.0002 cm), and total suspended solids which consist mainly of silt and clay particles, plankton, algae, fine organic debris, and other particulate matter that will not pass through the 2-micron filter.

High solids content, both dissolved and suspended, may have a negative impact on the domestic water supply, causing drinking water to be unpalatable and potentially hazardous. Furthermore, many industries, such as the food service, pharmaceutical, and medical industries, impose stringent quality standards on their water supplies so that the water does not have an adverse effect on their end products. Sadly, many of the available water supplies exceed the environmental protection agencies (EPA's) recommended maximum for total dissolved solids (TDS) and total suspended solids (TSS) levels. Monitoring and treatment of these water sources for TSS levels, TDS levels, and total solids levels (TS, which is the TDS+TSS) is therefore important to maintaining a desired water quality for both domestic and industrial activities.

Besides these domestic and industrial applications, TDS and TSS also affects anything that consumes, lives in, or uses water. For example, while high levels of TDS will result in excessive scaling in pipes, low levels of TDS may be unhealthy for plants (both aquatic and non-aquatic) and fish. Thus, careful monitoring of TDS levels in a water source can help in determining the appropriate types of water processing and/or treatment that must be applied to obtain a water output within a desired range of TDS levels.

Testing for TDS and TSS is generally performed using the gravimetric methods as outlined in ASTM D5907: "Standard Test Methods for Filterable Matter (Total Dissolved Solids) and Non-filterable Matter (Total Suspended Solids) in Water" or in Standard Methods 2540C: "Total Dissolved Solids Dried at 180° C." or in USGS I-1750-85. In these methods, the TSS in a water sample is captured on a filter which allows the TDS in the sample to pass through. The filtered water sample containing the TDS is then placed into a vessel which is heated to evaporate the liquid. The vessel is weighed on a precision analytical balance and the weight is subtracted from the weight of the vessel before sample introduction to determine the total weight of TDS per volume of liquid (noted as mg/ml or ppm).

The vessel used for the evaporation and weighing steps is typically made from silica glass, platinum, or ceramic having a relatively high total weight and overall geometric volume. As such, the vessel may experience significant absorption of moisture over time, leading to variations in the tare weight for the vessel measured before a sample has been introduced. Since the weight of the TDS is usually only a very small percentage of the total weight of the vessel, such variation may inhibit the ability to perform low weight dissolved solids testing. To combat this problem, a preconditioning step is performed on the vessel as follows: the vessel is heated to 180° C. for 1 hour and weighed. Before weighing, however, the vessel must be cooled to a proper balance temperature, which can be up to one hour. As such, preconditioning adds to the time and labor required to perform a test for TDS.

A further disadvantage of the prior art vessels is that they need to be cleaned before every use. For example, according to the EPA water quality testing manual (Method A: General Preparation of Sampling Containers), all vessels used in testing of conductivity, total solids, turbidity, pH, and total alkalinity should be washed with a brush and phosphate-free detergent, rinsed three times with cold tap water, and rinsed three times with distilled or deionized water. This step adds to the time and labor involved in performing a test, and may further increase the number of preconditioning steps required prior to use in a test as the vessel may absorb significant amounts of moisture during the wash step. Moreover, these vessels take up a large amount of lab storage space, and are fragile and thus easily broken if dropped.

Accordingly, there exists a need in the prior art for sample vessels that will improve the process of testing for TDS, TSS, and/or TS.

SUMMARY

The presently disclosed invention overcomes many of the shortcomings of the prior art by providing a thin film vessel or bag formed of a polymeric material with a melt temperature greater than 180° C. which may be used in gravimetric methods for measuring the total dissolved solids (TDS), total suspended solids (TSS), and/or the total solids (TS) in a liquid sample, or the moisture content in a solid sample. The testing bags disclosed herein will allow a user to more accurately perform low weight testing (i.e., low weight TS, TDS, TSS), as well as provide a disposable option which may not require preconditioning. Because the testing bags are disposable, they may ensure better test conformance because the risk of cross contamination due to improper washing is eliminated. Furthermore, because the testing bags utilize thin film materials which reduce the total weight of the vessel, they may improve the vessel's resistance to moisture absorption due to the minimized material volume of the vessel, and may thus also improve the weight stability of the vessel.

Thus, according to its major aspects, and briefly stated, the presently disclosed invention includes a vessel formed of a thin film polymeric material. The vessel may comprise a main body having an open top end and a sealed bottom end which define an inner cavity configured to hold a volume of liquid. The polymeric material may have a melting temperature greater than 180° C.

The vessel may comprise indicia applied to a portion of the main body, wherein the indicia indicates a tare weight of the vessel recorded after at least two preconditioning steps. A single preconditioning step includes heating the vessel to a high temperature for a specific length of time. The heating time and temperature may vary. In certain embodiments, the heating time and temperature comprise a time of about an hour and a temperature of at least 180° C. in certain other embodiments, the heating time and temperature comprise a time of greater than an hour, such as greater than 12 hours, and a temperature of at least 180° C.

In various embodiments, the preconditioning step further includes weighing the vessel after the step of heating the vessel. In these embodiments, the tare weight of the vessel comprises the final weight measured after subsequent preconditioning steps yield a recorded weight with a standard variation of less than 0.5 mg from the previously recorded weight of the vessel. In certain embodiments, the standard variation may be less than 0.1 mg, or even less than 0.05 mg.

In embodiments of the vessel, the polymeric material may be nylon, polyethylene terephthalate, polyethylene, or polypropylene. The vessel may also be made up a combination of the polymers listed. The volume of liquid held within the vessel may be an amount less than about 500 ml, preferably less than about 300 ml, more preferably less than about 150 ml. Further, the vessel may have a total tare weigh of between about 0.5 grams and 5.0 grams.

In certain embodiments, the main body may further comprise a front wall portion and a rear wall portion connected by longitudinal side wall portions. The main body may be flexible and may be self-standing or may need to be supported.

In certain other embodiments, the main body may further comprise a front wall portion and a rear wall portion connected along adjacent edges. The main body may be flexible and may be self-standing or may need to be supported.

In embodiments of the presently disclosed invention, the vessel may be used in gravimetric methods for testing of TDS, TSS, and TS in a liquid sample and percent moisture of a solid sample. This testing may be done according to standardized methods well known in the art such as, for example, ASTM D5907 and/or Standard Methods 2540 B, C, or D as listed in the Code of Federal Regulations (40 CFR 136.3) and/or USGS I-1750-85.

The presently disclosed invention also includes a method for testing TDS, TSS, and TS in a liquid sample. The method comprises (a) placing a volume of liquid into a vessel as described herein, (b) heating the vessel containing the liquid sample for a length of time sufficient to evaporate all of the liquid, and (c) heating the vessel to about 180° C. for a specified time, such as one hour, and weighting the vessel. In embodiments of the method, step (c) may be repeated until subsequent recorded weights of the vessel vary by less than 0.5 mg. In other embodiments, the standard variation may be less than 0.1 mg, or even less than 0.05 mg. The initial weight of the vessel (tare weight which may be marked on the vessel) may be subtracted from the final recorded weight to obtain the weight of the TS.

In certain embodiments of the method, the liquid sample is first passed through a filter, typically a filter with 2 micron pores, to capture the TSS. The filtered sample is then used for steps (a)-(c) to obtain a final vessel weight which may be used to calculate the TDS weight in the sample. Knowledge of the TS and TDS weights may be used to calculate a TSS weight as TS=TDS+TSS.

The presently disclosed invention further includes methods for preparing a vessel for use in a TDS, TSS, or TS assay and a testing product useable in a TDS, TSS, or TS assay. That is, a vessel may be prepared by performing at least one preconditioning step, wherein a single preconditioning step includes heating the vessel to a high temperature for a specific length of time and weighing the vessel. The heating time and temperature may vary, but are generally about an hour at about 180° C. The weight of the vessel is recorded and compared to a weight of the vessel recorded prior to the preconditioning step. If the variation in recorded weights is less than about 0.5 mg, the last recorded weight is then marked on the vessel. If the variation is greater than about 0.5 mg, another preconditioning step is performed. This process is continued until the variation in recorded weights is less than about 0.5 mg. In other embodiments, the process is continued until the variation in recorded weights is less than about 0.1 mg, or even less than 0.05 mg.

The presently disclosed invention further includes methods for preparing a vessel for use in a gravimetric method, such as for testing total dissolved solids in a liquid sample. The method may comprise preconditioning a vessel as described herein, wherein the preconditioning comprises heating the vessel to at least 180° C. for a specified time and weighing the vessel to obtain a tare weight; and applying an indicia to a portion of the main body, wherein the indicia include the tare weight of the vessel.

In certain embodiments, the preconditioning step may be repeated until subsequent recorded weights of the vessel vary by less than 0.5 mg, wherein the final recorded weight is the tare weight of the vessel; and

BRIEF DESCRIPTION OF THE DRAWINGS

Aspects, features, benefits and advantages of the embodiments herein will be apparent with regard to the following description, appended claims, and accompanying drawings. In the following figures, like numerals represent like features in the various views. It is to be noted that features and components in these drawings, illustrating the views of embodiments of the presently disclosed invention, unless stated to be otherwise, are not necessarily drawn to scale.

DETAILED DESCRIPTION

Figure 1:
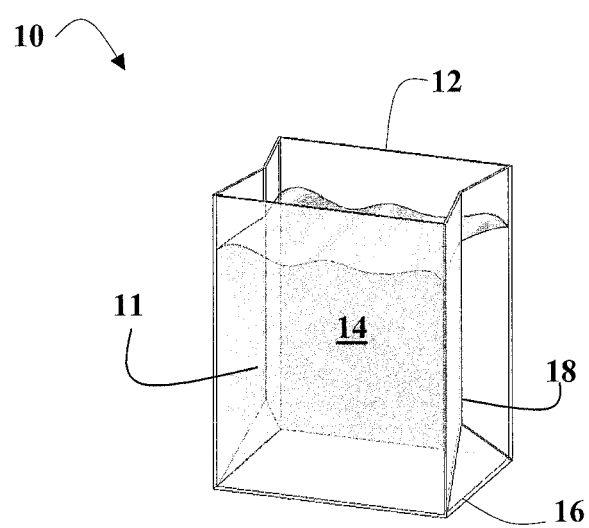
FIG. 1 illustrates a thin film high temperature polymeric flat bottom vessel containing water in accordance with certain aspects of the presently disclosed invention.

In the following description, the present invention is set forth in the context of various alternative embodiments and implementations involving a thin film high temperature polymeric vessel which may be used in gravimetric methods for measuring the total dissolved solids (TDS) or total solids (TS) in a liquid sample, or the moisture content in a solid sample. While the following description discloses numerous exemplary embodiments, the scope of the present patent application is not limited to the disclosed embodiments, but also encompasses combinations of the disclosed embodiments, as well as modifications to the disclosed embodiments.

Various aspects of the thin film high temperature polymeric vessel may be illustrated by describing components that are coupled, attached, and/or joined together. As used herein, the terms "coupled", "attached", and/or "joined" are interchangeably used to indicate either a direct connection between two components or, where appropriate, an indirect connection to one another through intervening or intermediate components. In contrast, when a component is referred to as being "directly coupled", "directly attached", and/or "directly joined" to another component, there are no intervening elements shown in said examples.

Various aspects of the thin film high temperature polymeric vessel may be illustrated with reference to one or more exemplary implementations. As used herein, the term "exemplary" means "serving as an example, instance, or illustration," and should not necessarily be construed as preferred or advantageous over other variations of the devices, systems, or methods disclosed herein. "Optional" or "optionally" means that the subsequently described event or circumstance may or may not occur, and that the description includes instances where the event occurs and instances where it does not. In addition, the word "comprising" as used herein means "including, but not limited to".

Relative terms such as "lower" or "bottom" and "upper" or "top" may be used herein to describe one element's relationship to another element illustrated in the drawings. It will be understood that relative terms are intended to encompass different orientations of aspects of the thin wall high temperature polymeric vessel in addition to the orientation depicted in the drawings. By way of example, if aspects of the thin film high temperature polymeric vessel in the drawings are turned over, elements described as being on the "bottom" side of the other elements would then be oriented on the "top" side of the other elements as shown in the relevant drawing. The term "bottom" can therefore encompass both an orientation of "bottom" and "top" depending on the particular orientation of the drawing.

It must also be noted that as used herein and in the appended claims, the singular forms "a", "an", and "the" include the plural reference unless the context clearly dictates otherwise. Unless defined otherwise, all technical and scientific terms used herein have the same meanings as commonly understood by one of ordinary skill in the art.

The presently disclosed invention is a vessel useable in gravimetric methods for measuring the TDS or TS in a liquid sample. The vessel includes a main body formed of a thin wall polymeric film or material. Some non-limiting examples of polymeric materials include polyolefin films, such as polyethylene including high density polyethylene (HDPE), linear low density polyethylene (LLDPE), or low density polyethylene (LDPE); ethylene copolymers, such as ethylene vinyl acetate (EVA) copolymers or ethylene methyl acrylate (EMA) copolymer, polyethylene terephthalate (PET), polyethylene terephthalate glycol (PETG) copolymer; polypropylenes (PP), polyethylene-propylene copolymers; polymers and copolymers of polyvinyl chloride (PVC), polyvinylidene chloride (PVDC); nylon; thermoplastic elastomers such as styrenic block copolymers, polyolefin blends, elastomeric alloys, thermoplastic polyurethanes, thermoplastic copolyesters and thermoplastic polyamides; cellulose acetates; ionomer (Surlyn®); polystyrene; polycarbonates; styrene acrylonitrile; aromatic polyesters; linear polyesters; thermoplastic polyvinyl alcohols; metalized films, such as metalized BoPET; and combinations thereof.

In preferred embodiments, the polymeric material may be any material capable of being formed into a thin film which may withstand temperatures of at least 180° C. without melting or deforming. The film may have a thickness of less than 0.01 inches, preferably less than 0.008 inches, and more preferably less than 0.006 inches.

In certain embodiments, the vessel may be a bag or cup formed by conventional cast or blown film processes. Alternatively, the vessel may be thermally formed from a high temperature polymeric film. The vessel may be formed to be flexible or may be formed to have non-flexible or low flexibility walls, or portions thereof, which may allow the vessel to be self-supporting. Further, in various embodiments, the vessel may be formed of flexible materials and may have a flat bottom which may allow the vessel to be self-standing.

In preferred embodiments, the vessel may be a bag that is thermally formed from thin walled polymeric films having a melting temperature greater than 180° C. Some non-limiting examples of such preferred high temperature polymeric films include at least nylon, polyethylene terephthalate, polyethylene, and polypropylene. In embodiments, the vessel may have a total weight of less than 5.0 grams, such as between 0.5 grams and 5.0 grams.

Figure 2:
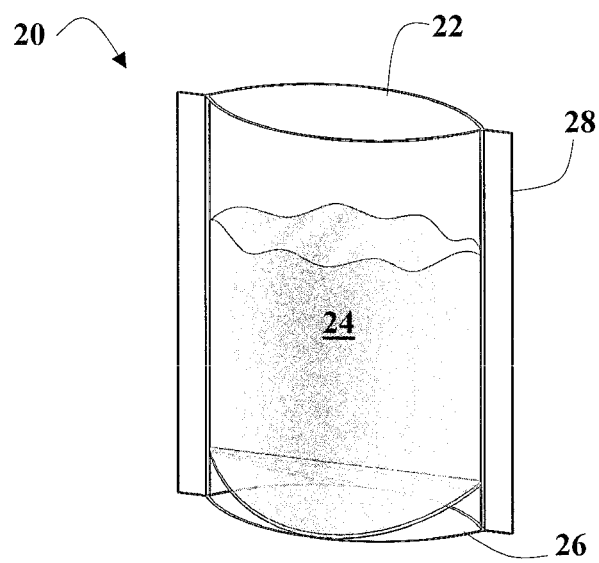
FIG. 2 illustrates a thin film high temperature polymeric gusseted standup vessel containing water in accordance with certain aspects of the presently disclosed invention.
Figure 3:
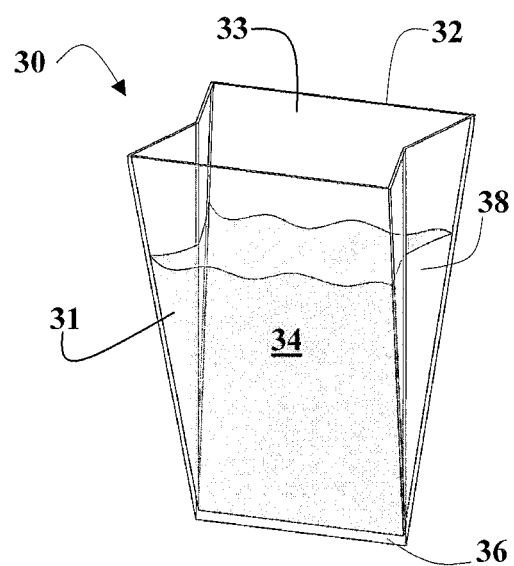
FIG. 3 illustrates a thin film high temperature polymeric pillow style three sided vessel containing water in accordance with certain aspects of the presently disclosed invention.

Referring now to the drawings, various embodiments of the thin film high temperature polymeric vessel of the presently disclosed invention are shown in FIGS. 1 through 3. FIG. 1 illustrates an embodiment of the vessel 10 having a flat bottom wall 16, longitudinally spaced opposing front and back walls 11, and connecting side walls 18 which allow the vessel to be self-standing. The vessel 10 further comprises an open top end 12 through which a liquid sample 14 may be deposited. As shown in FIG. 1, the bottom wall 16 and/or side walls 18 may be foldable so that the vessel 10 may be stored in a flat configuration. As such, many vessels may be packed together for shipping and sale, and may be easily stored in a small laboratory storage space.

FIG. 2 illustrates an embodiment of the vessel 20 having gusseted side walls 28 and a bottom wall 26 which allows the vessel to be self-standing. The vessel further comprises an open top 22 through which a liquid sample 24 may be deposited. As described above, the bottom wall 26 may be folded so that the vessel 20 may be stored in a flat configuration.

FIG. 3 illustrates another embodiment of the vessel 30 having a sealed bottom edge 36 and an open top edge 32 through which a liquid sample 34 may be deposited. The vessel 30 may be formed to have any number of wall portions, such as a front wall portion 31, a back wall portion 33, and side wall portions 38 as shown in FIG. 3. In certain embodiments, the vessel may be formed from a tube of high temperature thin walled polymeric material which is open along a top edge and folded and sealed along a bottom edge, or simply sealed along a bottom edge. As shown in FIG. 3, the vessel may not be self-standing but may need to be supported during use within a frame or other upstanding support such as, for example, a beaker.

As discussed above, the vessels and bags of the presently disclosed invention may be produced from any polymeric material capable of being formed into a thin film, and thus provide for a vessel having an overall weight that is significantly lower than that of the prior art ceramic containers used in TDS testing. The lower weight (and corresponding lower overall volume) allows for less potential absorption of atmospheric moisture and thus better weight stability. Weight stability is important during TDS and TS testing to attain high accuracy results.

The traditional containers used in testing TDS and/or TS typically weigh in excess of 50 grams, while the desired testing range for TDS is limited to a maximum of 200 mg. This large difference between the tested solid material weight and the weight of the container can cause resolution errors in determining the final weight of the solid material. In various embodiments of the presently disclosed invention, the total weight of the vessel may be between about 0.5 grams and about 5.0 grams. The lower weight of the vessel reduces the amount of moisture that may be absorbed, as discussed above, and consequently reduces the number of preconditioning steps required to achieve a stable tare weight.

Embodiments of the vessels and bags of the presently disclosed invention may have a tare weight marked thereon. That is, the vessel or bag may have an indicia applied to a portion of the main body, wherein the indicia include a tare weight of the vessel which is the weight of the vessel recorded after at least one preconditioning step. In certain embodiments, the tare weight of the vessel may be the weight of the vessel recorded after at least two preconditioning steps.

Each preconditioning step includes heating the vessel or bag to a high temperature for a specified time. The temperature may be about 180° C. and the time may be about an hour. The preconditioning step may include heating the vessel to at least 180° C. for a time greater than one hour, such as at least 6 hours, preferably at least 12 hours.

In certain embodiments, the preconditioning step may further include weighing the vessel after the step of heating the vessel. As mentioned above, the tare weight of the vessel may be the weight of the vessel recorded after at least one preconditioning step.

In certain embodiments, the weight of the vessel recorded after each preconditioning step may be compared to a weight recorder from a previous preconditioning step. If these weights vary by less than 0.5 mg, the last recorded weight may be the tare weight of the vessel. That is, the tare weight may not be recorded until subsequent preconditioning steps yields a variance of less than 0.5 mg. In certain embodiments, the tare weight may be recorded after subsequent preconditioning steps yields a variance of less than 0.1 mg, or even 0.05 mg. As such, the vessels and bags of the presently disclosed invention provide an accuracy and convenience that far exceeds that of the prior art vessels.

The vessel of the presently disclosed invention may also be used to test the moisture content of a solid sample. As indicated above for the liquid sample, the vessels may have a tare weight indicated thereon. A solid sample may be placed in the vessel and the weight of the vessel containing the solid sample may be recorded. The vessel may be heated to evaporate liquid from the solid sample, and the vessel may then be reweighed. The change in weights may be used to determine the moisture content of the solid sample. In certain embodiments of this method, the vessel may be preconditioned prior to use to ensure a stable tare weight for the vessel.

An alternate embodiment of the vessels and bags of the presently disclosed invention includes forming a moisture barrier coating on an inner surface, outer surface, or both inner and outer surfaces of the vessel to further aid in the weight stability by reducing moisture absorption. Alternatively, a metalized polymeric material such as, for example, metalized BoPET film may be used as the raw material for the vessel. Metalized polymeric films are very light weight and exhibit little to no moisture absorption over time. Thus, fewer or no preconditioning steps may be needed to record an accurate and stable tare weight for the vessel.

EXAMPLES

Vessels formed according to embodiments of the presently disclosed invention were used for TDS testing according the protocols described in ASTM D5907 or Standard Methods 2540 B, C, or D as listed in the Code of Federal Regulations (40 CFR 136.3) or USGS I-1750-85. These protocols are periodically updated with changes to the methods and/or protocol numbers. Thus, while specific protocol numbers and method details have been listed herein, the vessels and methods of the presently disclosed invention may find utility in methods beyond those listed. For example, the vessels may be used in methods which require heating temperatures greater than 180° C., such as greater than 200° C., or even greater than 225° C. Furthermore, typical volumes contained within the vessel are listed herein as less than 500 mL, preferably less than 150 mL. Changes in standard methods may require that greater or lesser volumes of sample are tested. As such, the vessels of the presently disclosed invention may be configured to accommodate various ranges of sample volume, such as greater than 500 mL or less than 150 mL. While the film thickness may remain the same, the total weight of the vessel may be increased or reduced in parallel with the overall change in size of the vessel.

Vessels according to embodiments of the presently disclosed invention were tested using the following protocol:

(1) Vessels were preconditioned by (a) heating for one hour at 180° C., and (b) weighing the vessel. Steps 1(a) and 1(b) were repeated until a subsequently measured weight differed by less than 0.5 mgs from a previously measured weight. Typically, this occurred within two rounds of heating/weighing, wherein the final measured weight was recorded as the tare weight of the vessel.

(2) A liquid sample containing a defined amount of solids was then added to a preconditioned vessel: for the examples shown below, 25-100 mL of water containing a known amount of KCl.

(3) The vessel was then heated at 104° C. for a length of time sufficient to evaporate all of the liquid: for the examples shown below, the samples were heated overnight.

(4) The vessel was then heated at 180° C. for 1 hour and weighed using a scale capable of 0.1 mg resolution.

(5) Step 4 was repeated until two consecutively measured weights were within 0.0005 grams (0.5 mg). This last measured weight was the final recorded weight.

(6) The final recovered solids weight was calculated as the final recorded weight of the vessel minus the tare weight of the vessel.

Example A

Both nylon and PET materials were used to form a thin film vessel according to the configuration shown in FIG. 3. A specific weight of KCl was dissolved in water and placed in each of the testing vessels (column labeled "Total Dissolved Solids Standard Weight (mg)"). The liquid was evaporated and the weight of the vessel was recorded after two preconditioning steps. The results from this TDS Standard testing are listed in Table 1. Both PET and Nylon vessels showed excellent recoveries. In addition, a low weight trial of 5 mg (trial #5) was performed and showed similar recovery percentages.

TABLE 1

Total Dissolved Solids standard testing recoveries using thin wall polymeric vessels

| Trial No. | Vessel Material | Initial Vessel Weight (grams) | Total Dissolved Solids Standard Weight (mg) | Total Dissolved Solids Recovered Weight (mg) | % Recovery |
|---|---|---|---|---|---|
| 1 | PET | 0.53724 | 167 | 167.1 | 100.06% |
| 2 | Nylon | 0.6867 | 160.4 | 160.3 | 99.94% |
| 3 | Nylon | 0.46314 | 148 | 149.26 | 100.85% |
| 4 | Nylon | 4.54338 | 142.2 | 141.43 | 99.46% |
| 5 | Nylon | 2.2803 | 5.04 | 5.1 | 101.19% |

Example B

Nylon vessels having a tare weight of less than 1 gram were tested for a range of standard weight recoveries which include standard weight samples comprising low (less than 100 mg), medium (between 100 mg and 150 mg), and high (greater than 150 mg) solids content. A control (blank) was included for several of the testing series, wherein the blank comprised water only. A standard test was considered successful (passed) if the final weight was within 10% (100%±10%), while a control (blank) test was considered successful if the final weight was within ±0.01 grams of the tare weight.

Results from TDS testing Test using low weight samples of 10 mg are shown in Table 2, and low weight samples of about 25 mg are shown in Tables 3 and 4. Additional testing was performed by a testing laboratory according to the same protocol using nylon vessels as described herein. Results from high weight trials (200 mg) are shown in Tables 5 and 6, results from medium weight trials (100 mg) are shown in Tables 7 and 8, and results from low weight trials (10 mg) are shown in Table 9. In all, the majority of vessels tested showed a TDS recovery percent within the pass parameters—within 10% of the standard weight measured.

While specific embodiments of the invention have been described in detail, it should be appreciated by those skilled in the art that various modifications and alternations and applications could be developed in light of the overall teachings of the disclosure. Accordingly, the particular arrangements, systems, apparatuses, and methods disclosed are meant to be illustrative only and not limiting as to the scope of the invention.

TABLE 2

Total Dissolved Solids standard test - low weight trials (~10 mg)

| | | Oven Temp (° C.) | | | | |
| | | 104 | 180 | 180 | | |
| | | Oven Time (min) | | | | |
| | | 960 | 60 | 60 | | |
| Bag Number | Tare Weight (g) | Weight 1 (g) | Weight 2 (g) | Weight 3 (g) | Recovered Weight (g) | Percent Recovered |
|---|---|---|---|---|---|---|
| 1 | 0.64240 | 0.65508 | 0.65345 | 0.65315 | 0.01075 | 100.37% |
| 2 | 0.64297 | 0.65581 | 0.65410 | 0.65370 | 0.01073 | 100.19% |
| 3 | 0.64440 | 0.65690 | 0.65454 | 0.65444 | 0.01004 | 93.74% |
| 4 | 0.64909 | 0.66210 | 0.65920 | 0.65943 | 0.01034 | 96.55% |
| 5 | 0.63524 | 0.64810 | 0.64651 | 0.64641 | 0.01117 | 104.30% |
| 6 | 0.64150 | 0.65360 | 0.65272 | 0.65242 | 0.01092 | 101.96% |
| 7 | 0.64395 | 0.65625 | 0.65459 | 0.65414 | 0.01019 | 95.14% |
| 8 | 0.64517 | 0.65799 | 0.65745 | 0.65749 | 0.01232 | 115.03% |
| 9 | 0.64803 | 0.66170 | 0.66008 | 0.65959 | 0.01156 | 107.94% |
| 10 | 0.64491 | 0.65836 | 0.65673 | 0.65626 | 0.01135 | 105.98% |
| 11 | 0.64883 | 0.66210 | 0.66012 | 0.65963 | 0.01080 | 100.84% |
| 12 | 0.63949 | 0.65310 | 0.65079 | 0.65054 | 0.01105 | 103.17% |
| 13 | 0.64755 | 0.65841 | 0.65782 | 0.65760 | 0.01005 | 93.84% |
| 14 | 0.64554 | 0.66325 | 0.65604 | 0.65596 | 0.01042 | 97.29% |
| 15 | 0.65034 | 0.66380 | 0.66235 | 0.66189 | 0.01155 | 107.84% |
| 17 | 0.65980 | 0.67360 | 0.67197 | 0.67159 | 0.01179 | 110.08% |
| 18 | 0.64909 | 0.66080 | 0.65883 | 0.65900 | 0.00991 | 92.53% |
| 19 | 0.64087 | 0.65404 | 0.65233 | 0.65192 | 0.01105 | 103.17% |
| 22 | 0.65541 | 0.66901 | 0.66649 | 0.66616 | 0.01075 | 100.37% |
| 23 | 0.66013 | 0.67350 | 0.67054 | 0.67029 | 0.01016 | 94.86% |

Standard: 25 ml water containing 0.01071 grams KCl

TABLE 3

Total Dissolved Solids standard test - low weight trials (~25 mg)

| | | Oven Temp (° C.) | | | | |
| | | 104 | 180 | 180 | | |
| | | Oven Time (min) | | | | |
| | | 960 | 60 | 60 | | |
| Bag Number | Tare Weight (g) | Weigh 1 (g) | Weigh 2 (g) | Weigh 3 (g) | Recovered Weight (g) | Percent Recovered |
|---|---|---|---|---|---|---|
| 25 | 0.65795 | 0.68405 | 0.68409 | 0.68360 | 0.02565 | 100.04% |
| 26 | 0.65288 | 0.67915 | 0.67920 | 0.67896 | 0.02608 | 101.72% |
| 27 | 0.65787 | 0.68389 | 0.68370 | 0.68356 | 0.02569 | 100.20% |
| 28 | 0.65539 | 0.68200 | 0.68188 | 0.68149 | 0.02610 | 101.79% |
| 29 | 0.66316 | 0.68925 | 0.68837 | 0.68830 | 0.02514 | 98.05% |
| 30 | 0.65775 | 0.68350 | 0.68349 | 0.68309 | 0.02534 | 98.83% |
| 31 | 0.65629 | 0.68149 | 0.68270 | 0.68189 | 0.02560 | 99.84% |
| 32 | 0.65690 | 0.68245 | 0.68219 | 0.68173 | 0.02483 | 96.84% |
| 33 | 0.65653 | 0.68230 | 0.68215 | 0.68177 | 0.02524 | 98.44% |
| 34 | 0.65009 | 0.67595 | 0.67528 | 0.67534 | 0.02525 | 98.48% |
| 35 | 0.64789 | 0.67390 | 0.67350 | 0.67374 | 0.02585 | 100.82% |
| 36 | 0.65338 | 0.67849 | 0.67835 | 0.67819 | 0.02481 | 96.76% |
| 37 | 0.65025 | 0.67575 | 0.67582 | 0.67561 | 0.02536 | 98.91% |
| 38 | 0.65191 | 0.67710 | 0.67750 | 0.67738 | 0.02547 | 99.34% |
| 39 | 0.65706 | 0.68235 | 0.68246 | 0.68225 | 0.02519 | 98.24% |
| 40 | 0.65399 | 0.67945 | 0.67989 | 0.67975 | 0.02576 | 100.47% |
| 41 | 0.66295 | 0.68875 | 0.68856 | 0.68815 | 0.02520 | 98.28% |
| 42 | 0.66134 | 0.68760 | 0.68765 | 0.68729 | 0.02595 | 101.21% |
| 43 | 0.66074 | 0.68673 | 0.68698 | 0.68649 | 0.02575 | 100.43% |
| 44 | 0.66009 | 0.68635 | 0.68679 | 0.68635 | 0.02626 | 102.42% |
| 45 | 0.66013 | 0.68429 | 0.68421 | 0.68401 | 0.02388 | 93.14% |
| 46 | 0.65735 | 0.68270 | 0.68218 | 0.68236 | 0.02501 | 97.54% |
| 47 | 0.64852 | 0.67465 | 0.67435 | 0.67397 | 0.02545 | 99.26% |
| 48 | 0.66251 | 0.68795 | 0.68817 | 0.68785 | 0.02534 | 98.33% |

Standard: 25 ml water containing 0.02565 grams KCl

TABLE 4

Total Dissolved Solids standard testing recoveries - Low Weight Trials (~25 mgs)

| | | Oven temp (° C.) | | | | | | |
| | | 104 | 180 | 180 | 180 | 180 | | |
| | | Oven time (min) | | | | | | |
| | | 960 | 60 | 60 | 60 | 60 | | |
| | Tare | Weigh 1 | Weigh 2 | Weigh 3 | Weigh 4 | Weigh 5 | Recovered | Percent |
| Bag Number | Weight (g) | (g) | (g) | (g) | (g) | (g) | Weight (g) | Recovered |
|---|---|---|---|---|---|---|---|---|
| 51 | 0.63621 | 0.66133 | 0.66075 | 0.66130 | 0.66092 | NA | 0.02471 | 98.37% |
| 52 | 0.62161 | 0.64698 | 0.64667 | 0.64696 | NA | NA | 0.02535 | 100.92% |
| 53 | 0.62361 | 0.64897 | 0.64879 | 0.64884 | NA | NA | 0.02523 | 100.44% |
| 54 | 0.62438 | 0.65008 | 0.65002 | 0.65011 | NA | NA | 0.02573 | 102.43% |
| 55 | 0.62448 | 0.64998 | 0.64978 | 0.64987 | NA | NA | 0.02539 | 101.08% |
| 56 | 0.62236 | 0.64740 | 0.64721 | 0.64770 | NA | NA | 0.02534 | 100.88% |
| 57 | 0.63036 | 0.65772 | 0.65745 | 0.65767 | NA | NA | 0.02731 | 108.72% |
| 58 | 0.62508 | 0.65078 | 0.65100 | 0.65111 | NA | NA | 0.02603 | 103.63% |
| 59 | 0.61005 | 0.63525 | 0.63547 | 0.63585 | NA | NA | 0.02580 | 102.71% |
| 60 | 0.61190 | 0.63754 | 0.63772 | 0.63795 | NA | NA | 0.02605 | 103.71% |
| 61 | 0.63941 | 0.66532 | 0.66485 | 0.66538 | 0.66488 | NA | 0.02547 | 101.40% |
| 62 | 0.61512 | 0.64127 | 0.64112 | 0.64150 | NA | NA | 0.02638 | 105.02% |
| 63 | 0.62531 | 0.65158 | 0.65097 | 0.65161 | 0.65121 | NA | 0.02590 | 103.11% |
| 64 | 0.62797 | 0.65428 | 0.65495 | 0.65365 | 0.65379 | NA | 0.02582 | 102.79% |
| 65 | 0.62538 | 0.65180 | 0.65143 | 0.65179 | NA | NA | 0.02641 | 105.14% |
| 66 | 0.62752 | 0.65438 | 0.65433 | 0.65456 | NA | NA | 0.02704 | 107.65% |
| 67 | 0.63192 | 0.65879 | 0.65806 | 0.65882 | 0.65824 | 0.65855 | 0.02663 | 106.02% |
| 68 | 0.62849 | 0.65529 | 0.65499 | 0.65527 | NA | NA | 0.02678 | 106.61% |
| 69 | 0.63686 | 0.66347 | 0.66305 | 0.66350 | NA | NA | 0.02664 | 106.06% |
| 70 | 0.63526 | 0.66196 | 0.66208 | 0.66235 | NA | NA | 0.02709 | 107.85% |
| 71 | 0.63264 | 0.65887 | 0.65895 | 0.65918 | NA | NA | 0.02654 | 105.66% |
| 72 | 0.64986 | 0.67615 | 0.67541 | 0.67636 | 0.67594 | NA | 0.02608 | 103.83% |

Standard: 25 ml water containing 0.02565 grams KCl
NA—not applicable; measured difference in weight between last two readings less than 0.5 mg.

TABLE 5

Total Dissolved Solids standard testing recoveries - High Weight Trials

| Sample (mg) | Volume (mL) | Bag # | Initial wt (g) | Final wt (g) 1 | Final wt (g) 2 | Final wt (g) 3 | Final wt (g) 4 | Final wt (g) 5 | wt (g) used | Final difference | TDS (g) | Percent recovery |
|---|---|---|---|---|---|---|---|---|---|---|---|---|
| blank | 100 | 39 | 0.64499 | 0.6449 | 0.6466 | 0.6417 | 0.6415 | NA | 0.6415 | 0.0002 | −0.0035 | −0.35% |
| 200.515 | 50 | 106 | 0.62887 | 0.8392 | 0.83 | 0.8269 | 0.8273 | NA | 0.8273 | 0.0004 | 0.1984 | 98.96% |
| 200.515 | 50 | 107 | 0.6278 | 0.828 | 0.8296 | 0.8291 | NA | NA | 0.8291 | 0.0005 | 0.2013 | 100.39% |
| 200.515 | 50 | 108 | 0.63299 | 0.8323 | 0.8336 | 0.831 | 0.8325 | 0.8322 | 0.8322 | 0.0003 | 0.1992 | 99.35% |
| 200.515 | 50 | 109 | 0.6316 | 0.832 | 0.8341 | 0.83 | 0.8295 | NA | 0.8295 | 0.0005 | 0.1979 | 98.70% |
| 200.515 | 50 | 110 | 0.63649 | 0.8361 | 0.8383 | 0.834 | 0.8338 | NA | 0.8338 | 0.0002 | 0.1973 | 98.40% |
| 200.515 | 50 | 111 | 0.64226 | 0.8413 | 0.844 | 0.8402 | 0.8397 | NA | 0.8397 | 0.0005 | 0.1974 | 98.47% |
| 200.515 | 50 | 112 | 0.63869 | 0.837 | 0.8387 | 0.8359 | 0.8355 | NA | 0.8355 | 0.0004 | 0.1968 | 98.15% |
| 200.515 | 50 | 113 | 0.64136 | 0.8394 | 0.8405 | 0.8369 | 0.838 | 0.8381 | 0.8381 | 0.0001 | 0.1967 | 98.12% |
| 200.515 | 50 | 114 | 0.64696 | 0.8472 | 0.8472 | NA | NA | NA | 0.8472 | 0 | 0.2002 | 99.86% |
| 200.515 | 50 | 115 | 0.64241 | 0.841 | 0.8411 | NA | NA | NA | 0.8411 | 0.0001 | 0.1987 | 99.09% |
| 200.515 | 50 | 116 | 0.63333 | 0.8316 | 0.832 | NA | NA | NA | 0.832 | 0.0004 | 0.1987 | 99.08% |
| 200.515 | 50 | 118 | 0.6386 | 0.8356 | 0.8382 | 0.833 | 0.8325 | NA | 0.8325 | 0.0005 | 0.1939 | 96.70% |

Standard: 4.0103 mg/mL
NA—not applicable; measured difference in weight between last two readings less than 0.5 mg.

TABLE 6

Total Dissolved Solids standard testing recoveries - High Weight Trials

| Sample (mg) | Volume (mL) | Bag # | Initial wt (g) | Final wt (g) 1 | Final wt (g) 2 | Final wt (g) 3 | Final wt (g) 4 | Final wt (g) 5 | wt (g) used | Final difference | TDS (g) | Percent recovery |
|---|---|---|---|---|---|---|---|---|---|---|---|---|
| blank | 50 | 48 | 0.64503 | 0.644 | 0.6453 | 0.6422 | 0.642 | NA | 0.642 | 0.0002 | −0.003 | −0.30% |
| 200.99 | 50 | 47 | 0.64934 | 0.8517 | 0.8517 | NA | NA | NA | 0.8517 | 0 | 0.2024 | 100.68% |
| 200.99 | 50 | 49 | 0.64335 | 0.8501 | 0.8511 | 0.8477 | 0.8472 | NA | 0.8472 | 0.0005 | 0.2039 | 101.42% |
| 200.99 | 50 | 50 | 0.63985 | 0.8459 | 0.8455 | NA | NA | NA | 0.8455 | 0.0004 | 0.2057 | 102.32% |
| 200.99 | 50 | 51 | 0.6324 | 0.8382 | 0.836 | 0.8372 | 0.8367 | NA | 0.8367 | 0.0005 | 0.2043 | 101.65% |

TABLE 6-continued

Total Dissolved Solids standard testing recoveries - High Weight Trials

| Sample (mg) | Volume (mL) | Bag # | Initial wt (g) | Final wt (g) 1 | Final wt (g) 2 | Final wt (g) 3 | Final wt (g) 4 | Final wt (g) 5 | wt (g) used | Final difference | TDS (g) | Percent recovery |
|---|---|---|---|---|---|---|---|---|---|---|---|---|
| 200.99 | 50 | 52 | 0.63511 | 0.8403 | 0.8371 | 0.838 | 0.8377 | NA | 0.8377 | 0.0003 | 0.2026 | 100.80% |
| 200.99 | 50 | 53 | 0.6284 | 0.8333 | 0.8325 | 0.8327 | NA | NA | 0.8327 | 0.0002 | 0.2043 | 101.65% |
| 200.99 | 50 | 54 | 0.63605 | 0.8417 | 0.8412 | NA | NA | NA | 0.8412 | 0.0005 | 0.2052 | 102.07% |
| 200.99 | 50 | 55 | 0.6428 | 0.8481 | 0.846 | 0.8461 | NA | NA | 0.8461 | 0.0001 | 0.2033 | 101.15% |
| 200.99 | 50 | 56 | 0.63975 | 0.8431 | 0.8426 | NA | NA | NA | 0.8426 | 0.0005 | 0.2029 | 100.93% |
| 200.99 | 50 | 57 | 0.64083 | 0.8444 | 0.8453 | 0.8453 | NA | NA | 0.8453 | 0 | 0.2045 | 101.73% |
| 200.99 | 50 | 59 | 0.63549 | 0.8375 | 0.8403 | 0.8376 | 0.8371 | NA | 0.8371 | 0.0005 | 0.2016 | 100.31% |
| 200.99 | 50 | 60 | 0.63218 | 0.8355 | 0.835 | NA | NA | NA | 0.835 | 0.0005 | 0.2028 | 100.91% |
| 200.99 | 50 | 61 | 0.63466 | 0.8373 | 0.8385 | 0.8372 | 0.8367 | NA | 0.8367 | 0.0005 | 0.202 | 100.52% |
| 200.99 | 50 | 62 | 0.64063 | 0.8422 | 0.8425 | NA | NA | NA | 0.8425 | 0.0003 | 0.2019 | 100.44% |
| 200.99 | 50 | 63 | 0.63525 | 0.8371 | 0.8372 | NA | NA | NA | 0.8372 | 0.0001 | 0.202 | 100.48% |
| 200.99 | 50 | 64 | 0.63613 | 0.8411 | 0.8426 | 0.8402 | 0.8405 | NA | 0.8405 | 0.0003 | 0.2044 | 101.68% |
| 200.99 | 50 | 65 | 0.63391 | 0.8352 | 0.8348 | NA | NA | NA | 0.8348 | 0.0004 | 0.2009 | 99.95% |
| 200.99 | 50 | 66 | 0.62868 | 0.8335 | 0.8343 | 0.834 | NA | NA | 0.834 | 0.0003 | 0.2053 | 102.15% |
| 200.99 | 50 | 67 | 0.63269 | 0.8369 | 0.8386 | 0.8323 | 0.8348 | 0.8343 | 0.8343 | 0.0005 | 0.2016 | 100.31% |
| 200.99 | 50 | 68 | 0.6323 | 0.8375 | 0.8384 | 0.8318 | 0.8319 | NA | 0.8319 | 0.0001 | 0.1996 | 99.31% |
| 200.99 | 50 | 69 | 0.6538 | 0.8572 | 0.8585 | 0.8519 | 0.8515 | NA | 0.8515 | 0.0004 | 0.1977 | 98.36% |
| 200.99 | 50 | 70 | 0.6376 | 0.8412 | 0.842 | 0.8416 | NA | NA | 0.8416 | 0.0004 | 0.204 | 101.50% |

Standard: 4.0198 mg/mL

TABLE 7

Total Dissolved Solids standard testing recoveries - Medium Weight Trials

| Sample (mg) | Volume (mL) | Bag # | Initial wt (g) | Final wt (g) 1 | Final wt (g) 2 | Final wt (g) 3 | Final wt (g) 4 | wt (g) used | Final difference | TDS (g) | Percent recovery |
|---|---|---|---|---|---|---|---|---|---|---|---|
| blank | 50 | 121 | 0.64732 | 0.6476 | 0.6461 | 0.6466 | NA | 0.6466 | 0 | −0.0007 | −0.07% |
| 100.205 | 50 | 122 | 0.64692 | 0.7492 | 0.7477 | 0.7473 | NA | 0.7473 | 0.0004 | 0.1004 | 100.17% |
| 100.205 | 50 | 123 | 0.64621 | 0.7462 | 0.7457 | NA | NA | 0.7457 | 0.0005 | 0.0995 | 99.29% |
| 100.205 | 50 | 124 | 0.63899 | 0.7388 | 0.7384 | NA | NA | 0.7384 | 0.0004 | 0.0994 | 99.21% |
| 100.205 | 50 | 125 | 0.63319 | 0.7319 | 0.7323 | NA | NA | 0.7323 | 0.0004 | 0.0991 | 98.91% |
| 100.205 | 50 | 126 | 0.64529 | 0.7509 | 0.7438 | 0.7434 | NA | 0.7434 | 0.0004 | 0.0981 | 97.91% |
| 100.205 | 50 | 127 | 0.65533 | 0.7575 | 0.7544 | 0.754 | NA | 0.754 | 0.0004 | 0.0987 | 98.47% |
| 100.205 | 50 | 128 | 0.65111 | 0.7533 | 0.7479 | 0.7474 | NA | 0.7474 | 0.0005 | 0.0963 | 96.09% |
| 100.205 | 50 | 129 | 0.64583 | 0.7459 | 0.7428 | 0.7425 | NA | 0.7425 | 0.0003 | 0.0967 | 96.47% |
| 100.205 | 50 | 130 | 0.64998 | 0.7483 | 0.7465 | 0.746 | NA | 0.746 | 0.0005 | 0.096 | 95.82% |
| 100.205 | 50 | 131 | 0.65568 | 0.7534 | 0.7532 | NA | NA | 0.7532 | 0.0002 | 0.0975 | 97.32% |
| 100.205 | 50 | 132 | 0.64883 | 0.7497 | 0.7458 | 0.7468 | 0.7466 | 0.7466 | 0.0002 | 0.0978 | 97.57% |
| 100.205 | 50 | 133 | 0.65163 | 0.754 | 0.7506 | 0.7475 | 0.748 | 0.748 | 0.0005 | 0.0964 | 96.17% |
| 100.205 | 50 | 134 | 0.65401 | 0.7592 | 0.7505 | 0.7502 | NA | 0.7502 | 0.0003 | 0.0962 | 95.99% |
| 100.205 | 50 | 135 | 0.64929 | 0.7554 | 0.746 | 0.7456 | NA | 0.7456 | 0.0004 | 0.0963 | 96.11% |
| 100.205 | 50 | 136 | 0.6503 | 0.7492 | 0.7471 | 0.7469 | NA | 0.7469 | 0.0002 | 0.0966 | 96.40% |
| 100.205 | 50 | 137 | 0.65167 | 0.7496 | 0.7486 | 0.7487 | NA | 0.7487 | 0.0001 | 0.097 | 96.83% |
| 100.205 | 50 | 138 | 0.63879 | 0.7365 | 0.7354 | 0.7349 | NA | 0.7349 | 0.0005 | 0.0961 | 95.91% |
| 100.205 | 50 | 139 | 0.63492 | 0.7317 | 0.7321 | NA | NA | 0.7321 | 0.0004 | 0.0972 | 96.98% |
| 100.205 | 50 | 140 | 0.65061 | 0.7503 | 0.7466 | 0.7463 | NA | 0.7463 | 0.0003 | 0.0957 | 95.49% |
| 100.205 | 50 | 141 | 0.6572 | 0.7573 | 0.7522 | 0.7522 | NA | 0.7522 | 0 | 0.095 | 94.81% |
| 100.205 | 50 | 142 | 0.64917 | 0.7478 | 0.746 | 0.7455 | NA | 0.7455 | 0.0005 | 0.0963 | 96.13% |
| 100.205 | 50 | 143 | 0.64966 | 0.7464 | 0.7459 | NA | NA | 0.7459 | 0.0005 | 0.0962 | 96.04% |
| 100.205 | 50 | 144 | 0.65333 | 0.7504 | 0.7499 | NA | NA | 0.7499 | 0.0005 | 0.0966 | 96.37% |

Standard: 2.0041 mg/mL

TABLE 8

Total Dissolved Solids standard testing recoveries - Medium Weight Trials

| Sample (mg) | Volume (mL) | Bag # | Initial wt (g) | Final wt (g) 1 | Final wt (g) 2 | Final wt (g) 3 | Final wt (g) 4 | wt (g) used | Final difference | TDS (g) | Percent recovery |
|---|---|---|---|---|---|---|---|---|---|---|---|
| blank | 50 | 170 | 0.63772 | 0.6353 | 0.6353 | NA | NA | 0.6353 | 0 | −0.0024 | −0.24% |
| 100.415 | 50 | 171 | 0.63185 | 0.7276 | 0.7277 | NA | NA | 0.7277 | 0.0001 | 0.0959 | 95.45% |
| 100.415 | 50 | 172 | 0.63739 | 0.7369 | 0.7393 | 0.7382 | 0.7382 | 0.7382 | 0 | 0.1008 | 100.39% |
| 100.415 | 50 | 173 | 0.6246 | 0.7225 | 0.72 | 0.7197 | NA | 0.7197 | 0.0003 | 0.0951 | 94.71% |
| 100.415 | 50 | 174 | 0.62652 | 0.723 | 0.7233 | NA | NA | 0.7233 | 0.0003 | 0.0968 | 96.38% |
| 100.415 | 50 | 175 | 0.63025 | 0.7268 | 0.7265 | NA | NA | 0.7265 | 0.0003 | 0.0963 | 95.85% |

TABLE 8-continued

Total Dissolved Solids standard testing recoveries - Medium Weight Trials

| Sample (mg) | Volume (mL) | Bag # | Initial wt (g) | Final wt (g) 1 | Final wt (g) 2 | Final wt (g) 3 | Final wt (g) 4 | wt (g) used | Final difference | TDS (g) | Percent recovery |
|---|---|---|---|---|---|---|---|---|---|---|---|
| 100.415 | 50 | 176 | 0.64325 | 0.7373 | 0.7377 | NA | NA | 0.7377 | 0.0004 | 0.0945 | 94.06% |
| 100.415 | 50 | 177 | 0.64741 | 0.737 | 0.7366 | NA | NA | 0.7366 | 0.0004 | 0.0892 | 88.82% |
| 100.415 | 50 | 178 | 0.64143 | 0.7432 | 0.7434 | NA | NA | 0.7434 | 0.0002 | 0.102 | 101.55% |
| 100.415 | 50 | 179 | 0.63314 | 0.7295 | 0.7292 | NA | NA | 0.7292 | 0.0003 | 0.0961 | 95.66% |
| 100.415 | 50 | 180 | 0.6147 | 0.7217 | 0.7225 | 0.7222 | NA | 0.7222 | 0.0003 | 0.1075 | 107.06% |
| 100.415 | 50 | 181 | 0.6376 | 0.7326 | 0.7328 | NA | NA | 0.7328 | 0.0002 | 0.0952 | 94.81% |
| 100.415 | 50 | 182 | 0.63718 | 0.7307 | 0.7308 | NA | NA | 0.7308 | 0.0001 | 0.0936 | 93.23% |
| 100.415 | 50 | 183 | 0.63697 | 0.7298 | 0.7295 | NA | NA | 0.7295 | 0.0003 | 0.0925 | 92.15% |
| 100.415 | 50 | 184 | 0.64373 | 0.736 | 0.736 | NA | NA | 0.736 | 0 | 0.0923 | 91.89% |
| 100.415 | 50 | 185 | 0.64055 | 0.7342 | 0.7344 | NA | NA | 0.7344 | 0.0002 | 0.0939 | 93.46% |
| 100.415 | 50 | 186 | 0.64771 | 0.7403 | 0.7408 | NA | NA | 0.7408 | 0.0005 | 0.0931 | 92.71% |
| 100.415 | 50 | 187 | 0.63534 | 0.7268 | 0.7265 | NA | NA | 0.7265 | 0.0003 | 0.0912 | 90.78% |
| 100.415 | 50 | 188 | 0.6308 | 0.7232 | 0.7233 | NA | NA | 0.7233 | 0.0001 | 0.0925 | 92.12% |
| 100.415 | 50 | 189 | 0.6319 | 0.7208 | 0.7203 | NA | NA | 0.7203 | 0.0005 | 0.0884 | 88.03% |
| 100.415 | 50 | 190 | 0.63155 | 0.7236 | 0.724 | NA | NA | 0.724 | 0.0004 | 0.0925 | 92.07% |
| 100.415 | 50 | 191 | 0.63344 | 0.7232 | 0.7234 | NA | NA | 0.7234 | 0.0002 | 0.09 | 89.59% |
| 100.415 | 50 | 192 | 0.63604 | 0.7294 | 0.7294 | NA | NA | 0.7294 | 0 | 0.0934 | 92.97% |

Standard: 2.0083 mg/mL

TABLE 9

Total Dissolved Solids standard testing recoveries - Low Weight Trials

| Sample (mg) | Volume (mL) | Bag # | Initial wt (g) | Final wt (g) 1 | Final wt (g) 2 | Final wt (g) 3 | wt (g) used | Final difference | TDS (g) | Percent Recovery |
|---|---|---|---|---|---|---|---|---|---|---|
| 10.03 | 50 | 301 | 0.60837 | 0.6193 | 0.6191 | NA | 0.6191 | 0.0002 | 0.0107 | 106.98% |
| 10.03 | 50 | 305 | 0.6066 | 0.6163 | 0.6159 | NA | 0.6159 | 0.0004 | 0.0093 | 92.72% |
| 10.03 | 50 | 306 | 0.60002 | 0.6067 | 0.6104 | 0.6101 | 0.6101 | 0.0003 | 0.0101 | 100.50% |
| 10.03 | 50 | 307 | 0.60193 | 0.6117 | 0.6117 | NA | 0.6117 | 0 | 0.0098 | 97.41% |
| 10.03 | 50 | 308 | 0.61248 | 0.622 | 0.6222 | NA | 0.6222 | 0.0002 | 0.0097 | 96.91% |
| 10.03 | 50 | 309 | 0.61932 | 0.6293 | 0.6282 | 0.6282 | 0.6282 | 0.0089 | 0.0089 | 88.53% |
| 10.03 | 50 | 310 | 0.60518 | 0.6137 | 0.6141 | NA | 0.6141 | 0.0004 | 0.0089 | 88.93% |
| 10.03 | 50 | 311 | 0.61292 | 0.6258 | 0.6236 | 0.6233 | 0.6233 | 0.0003 | 0.0104 | 103.49% |

Standard: 0.2006 mg/mL

What is claimed is:

1. A method for testing total dissolved solids in a liquid sample, the method comprising:
 placing a volume of liquid into a testing vessel, wherein the testing vessel comprises:
  a main body comprising an open top end and a sealed bottom end to define an inner cavity configured to hold a volume of liquid, wherein the main body comprises a thin walled polymeric material having a melting temperature greater than 180° C.; and
  an indicia applied to a portion of the main body indicating a tare weight of the testing vessel, wherein the tare weight of the testing vessel comprises a weight of the testing vessel measured after at least one preconditioning step, wherein the at least one preconditioning step comprises heating the testing vessel to at least 180° C. for a first length of time,
 heating the testing vessel containing the liquid sample for a time sufficient to evaporate the volume of liquid;
 heating the testing vessel at 180° C. for a second length of time and weighing the testing vessel; and
 repeating the step of heating the testing vessel at 180° C. for the second length of time and weighing the testing vessel until a subsequently recorded weight of the testing vessel varies by less than 0.5 mg from a previously recorded weight.

2. The method of claim 1, wherein the second length of time comprise a time of one hour.

3. The method of claim 1, wherein the first length of time comprises a time of at least one hour.

4. The method of claim 1, wherein the volume of liquid comprises a volume of less than 150 ml.

5. The method of claim 1, wherein the weight of the testing vessel comprises a weight of between 0.5 grams and 5.0 grams.

6. The method of claim 1, wherein the polymeric material comprises nylon, polyethylene terephthalate, polyethylene, polypropylene, or a combination thereof.

7. The method of claim 1, wherein the wall thickness of the thin walled polymeric material is less than 0.008 inches.

8. A method of producing a vessel useful for gravimetric testing, the method comprising:
 performing at least one preconditioning step on the vessel, wherein the at least one preconditioning step comprises heating the vessel to at least 180° C. for a specified time and weighing the vessel to obtain a tare weight of the vessel, wherein the vessel comprises:
  a main body having an open top end and a sealed bottom end to define an inner cavity configured to hold a volume of liquid, wherein the main body comprises a thin walled polymeric material having a melting temperature greater than 180° C.; and
 applying an indicia to a portion of the main body of the vessel, wherein the indicia include the tare weight of the vessel.

9. The method of claim 8, further comprising:
repeating the preconditioning step until subsequent recorded weights of the vessel vary by less than 0.5 mg.

10. The method of claim 8, wherein the tare weight of the vessel comprises a weight of between 0.5 grams and 5.0 grams.

11. The method of claim 8, wherein the vessel has a wall thickness of less than 0.008 inches.

12. The method of claim 1, wherein a value of the tare weight may be subtracted from a value of the subsequently recorded weight to determine a weight of the total dissolved solids in the volume of liquid.

13. A method of producing a vessel useful for gravimetric testing, the method comprising:
performing a preconditioning step on the vessel, wherein the preconditioning step comprises heating the vessel to at least 180° C. for a specified time and weighing the vessel, wherein the vessel comprises:
a main body having an open top end and a sealed bottom end to define an inner cavity configured to hold a volume of liquid, wherein the main body comprises a thin walled polymeric material having a melting temperature greater than 180° C.;
repeating the preconditioning step until a subsequently recorded weight of the vessel varies by less than 0.5 mg from a previously recorded weight, wherein the subsequently recorded weight of the vessel is a tare weight of the vessel; and
applying an indicia to a portion of the main body of the vessel, wherein the indicia include the tare weight of the vessel.

14. The method of claim 13, wherein the tare weight of the vessel is a weight of 0.5 grams to 5.0 grams.

* * * * *